W. H. BUSTER & S. VARNELL.
BICYCLE FORK.
APPLICATION FILED SEPT. 18, 1912.
1,090,381.
Patented Mar. 17, 1914.
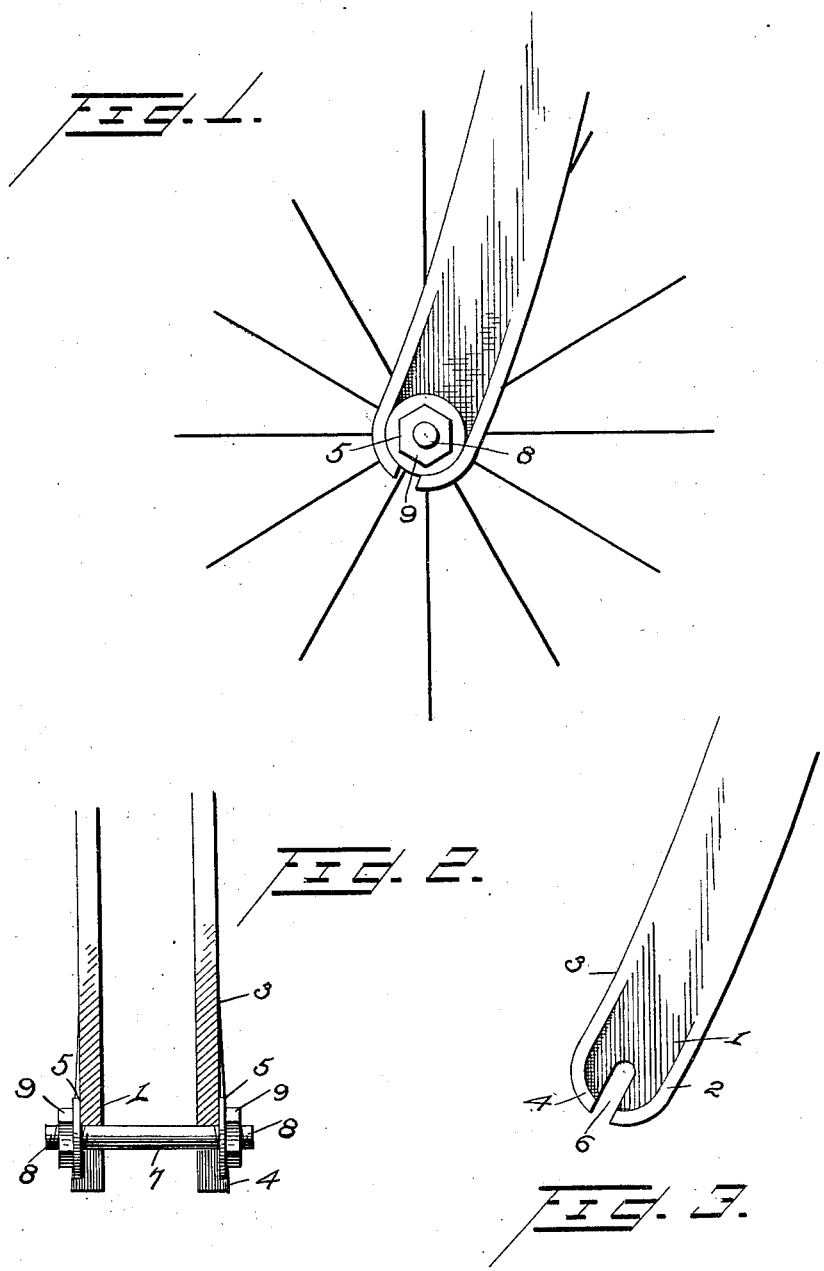
WITNESSES
INVENTORS
W. H. Buster and
Sidney Varnell
Attorney

UNITED STATES PATENT OFFICE.

WILLIAM H. BUSTER AND SIDNEY VARNELL, OF KINGSLAND, ARKANSAS.

BICYCLE-FORK.

1,090,381. Specification of Letters Patent. Patented Mar. 17, 1914.

Application filed September 18, 1912. Serial No. 721,081.

*To all whom it may concern:*

Be it known that we, WILLIAM H. BUSTER and SIDNEY VARNELL, citizens of the United States, residing at Kingsland, in the county of Cleveland and State of Arkansas, have invented certain new and useful Improvements in Bicycle-Forks, of which the following is a specification.

This invention relates to bicycle forks, and more particularly to that class of forks whereby the wheel may be removed from the fork without springing the fork and without removing any of the parts from the axle of the wheel.

One of the principal objects of our invention is to provide a bicycle or motorcycle fork from which the wheel may be removed without springing the fork and without danger of stripping the threads from the axle.

Another object of our invention is to provide a fork from which the wheel may be removed without removing any parts from the axle.

A still further object is to provide means for holding a wheel in quick detachable relationship with a bicycle fork, the means comprising a slot in combination with a shoulder formed integral with the fork.

These and other objects may be attained by means of the novel construction, combination, and arrangement of parts hereinafter described and illustrated in the accompanying drawing, in which—

Figure 1, is a side elevation of the lower end of a bicycle fork embodying our invention, parts of the wheel being broken away. Fig. 2, is a vertical section through the fork showing the axle in place. Fig. 3, is a side elevation of the fork showing the axle removed.

The preferred embodiment of our invention provides the lower end of each of the prongs of a bicycle fork 1 with an integral shoulder 2 having its outer edge conforming to the periphery of the fork. This shoulder is formed by the outer periphery of the fork being raised or flanged, the flange gradually rising from a point 3 where it merges with the outer surface of the fork to a point 4 where it attains its greatest thickness. The inner edge of the shoulder is made to conform to the periphery of a washer 5, preferably of circular form, and this washer is of a thickness equal to the depth of the flange at its lowest point so that the outer surface of the washer will lie flush with the outer surface of the flange.

The lower end of the fork is further provided with a slot 6, extending from a point corresponding with the center of the washer, downwardly in the general direction of the central line of the fork to the periphery of the fork and this slot is rounded at its upper end to conform to the periphery of the axle 7, which is seated therein. As shown in Fig. 2 the axle has its ends extended as at 8, and threaded to receive the nuts 9.

The operation of our device may be described as follows: The wheel being mounted upon the axle 7, the axle is seated in the slots 6 and the washers 5 are put on and slipped up until they are about the outer surface of the lower end 1 of the fork in which position the washers are engaged by the shoulders 2. The nuts 9 are then tightened up. In this position it is readily apparent that the wheel is held firmly in place. When it is desired to remove the wheel for any purpose, the nuts 9 are loosened and unscrewed until the washers 5 are clear of the shoulders, then the axle may be slipped out of the slots 6 without removing any of the parts from the axle. Thus it is apparent that our construction does away with all the old operation of removing the parts from the axle, and springing the forks to remove the wheel, and it also does away with the danger of stripping the threads from the axle in the operation of springing the forks.

Although, we have shown and described the preferred embodiment of our invention, yet we reserve and may exercise the right to make any changes therein, as do not depart from the spirit of the invention and the scope of the appended claims.

Having thus described our invention, what we claim as new and desire to secure by Letters Patent is:

1. A bicycle fork having each prong provided with a shoulder and a slot, said slot dividing said shoulder at its greatest depth and at the lower end of said fork, an axle seated in said slot, washers fitted on the ends of the axle, said washers engaging said shoulder, said axle having its ends extended and screw threaded for the reception of the nuts.

2. A bicycle fork having its lower end slotted and formed with a shoulder divided by the slot.

3. A bicycle fork having its lower end slotted, and formed with a shoulder, said shoulder being divided by said slot at the lower end of the fork; said shoulder conforming in outline to the outer periphery of the fork.

4. A bicycle fork having its lower end slotted and formed with a lateral shoulder, a washer, an axle inserted through the slot, and having said washer applied thereto, said shoulder conforming to the outer edge of said washer, said slot dividing said shoulder at its greatest depth and at the lower end of the fork.

In testimony whereof we affix our signatures in presence of two witnesses.

WILLIAM H. BUSTER.
SIDNEY VARNELL.

Witnesses:
C. K. WHEELER,
E. R. BUSTER.

Copies of this patent may be obtained for five cents each, by addressing the "Commissioner of Patents, Washington, D. C."